(12) United States Patent
Marin et al.

(10) Patent No.: US 9,730,148 B2
(45) Date of Patent: Aug. 8, 2017

(54) PROCEDURE FOR SELECTING NETWORK DISCOVERY METHOD

(71) Applicant: Nokia Technologies Oy, Espoo (FI)

(72) Inventors: Janne Marin, Espoo (FI); Mika Kasslin, Espoo (FI); Jarkko Kneckt, Espoo (FI); Olli Alanen, Vantaa (FI); Enrico Henrik Rantala, Berkeley, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/638,165

(22) Filed: Mar. 4, 2015

(65) Prior Publication Data
US 2016/0262090 A1 Sep. 8, 2016

(51) Int. Cl.
| | |
|---|---|
| *H04B 7/00* | (2006.01) |
| *H04W 48/16* | (2009.01) |
| *H04W 74/08* | (2009.01) |
| *H04W 84/12* | (2009.01) |

(52) U.S. Cl.
CPC ....... *H04W 48/16* (2013.01); *H04W 74/0816* (2013.01); *H04W 84/12* (2013.01)

(58) Field of Classification Search
CPC ..... H04W 40/24; H04W 48/08; H04W 48/10; H04W 48/14; H04W 48/20
USPC ............... 370/310, 328, 329, 431, 464
See application file for complete search history.

(56) References Cited

U.S. PATENT DOCUMENTS

| | | | | |
|---|---|---|---|---|
| 7,224,970 B2 * | 5/2007 | Smith | ............... | H04W 52/0229 370/352 |
| 8,620,312 B2 * | 12/2013 | Gidvani | ................ | H04W 24/10 340/7.42 |
| 9,008,062 B2 * | 4/2015 | Sun | ........................ | H04W 48/12 370/338 |
| 9,198,120 B2 * | 11/2015 | Liu | ........................ | H04W 48/16 |
| 9,408,136 B2 * | 8/2016 | Venkatraman | ......... | H04W 48/16 |
| 2007/0248058 A1 * | 10/2007 | Fajardo | ................. | H04W 24/00 370/338 |
| 2008/0176561 A1 | 7/2008 | Shao et al. | .................... | 455/434 |
| 2011/0045771 A1 | 2/2011 | Sen et al. | ..................... | 455/41.2 |
| 2011/0191473 A1 | 8/2011 | Sakai et al. | .................. | 709/224 |

(Continued)

OTHER PUBLICATIONS

IEEE P802.11ai/D4.0, Wireless LAN MAC and PHY Specifications, IEEE, Feb. 2015, 160 pages.*

(Continued)

*Primary Examiner* — Dmitry H Levitan
(74) *Attorney, Agent, or Firm* — Harrington & Smith

(57) ABSTRACT

A solution for selecting a network discovery method in an apparatus. The apparatus performs the following: performing initial channel assessment of a radio channel at maximum a determined time period shorter than or equal to the shortest of a plurality of discovery frame broadcast periodicities employed by access nodes the apparatus is configured to search for in network discovery; upon determining that a transmission has been detected in the initial channel assessment, selecting a network discovery according to a first network discovery method; and upon detecting no transmission on the radio channel during the initial channel assessment, selecting network discovery according to a second network discovery method different from the first network discovery method.

20 Claims, 5 Drawing Sheets

(56) References Cited

U.S. PATENT DOCUMENTS

| | | | |
|---|---|---|---|
| 2013/0230035 A1* | 9/2013 | Grandhi | H04W 48/16 370/338 |
| 2014/0016511 A1 | 1/2014 | Segev et al. | 370/255 |
| 2015/0351026 A1* | 12/2015 | Lee | H04W 40/244 370/237 |
| 2016/0249280 A1* | 8/2016 | Kneckt | H04W 48/16 |

OTHER PUBLICATIONS

K. Yunoki et al.; "Hybrid Scanning"; IEEE 11-12/0277r5; May 8, 2012; whole document (44 pages).

IEEE Std 802.11ac-2013; "IEEE Standard for Information technology—Telecommunications and information exchange between systems—Local and metropolitan area networks—Specific requirements; Part 11: Wireless LAN Medium Access (MAC) and Physical Layer (PHY) Specifications; Amendment 4: Enhancements for Very High Throughput for Operation in Bands below 6 GHz"; IEEE Computer Society; 2013; whole document (425 pages).

IEEE Std 802.11n-2009; "IEEE Standard for Information technology—Telecommunications and information exchange between systems—Local and metropolitan area networks—Specific requirements; Part 11: Wireless LAN Medium Access (MAC) and Physical Layer (PHY) Specifications; Amendment 5: Enhancements for Higher Throughput"; IEEE Computer Society; 2009; whole document (536 pages).

* cited by examiner

PROCEDURE FOR SELECTING NETWORK DISCOVERY METHOD

FIELD

The invention relates to the field of wireless communications and, particularly, to scanning for a wireless network in a wireless device.

BACKGROUND

A wireless device supporting a wireless communication protocol may be configured to scan for available communication channels before initiating a link setup with an access node or another terminal device of a wireless network. The scanning may comprise passive scanning in which the terminal device scans for broadcast messages or active scanning in which the terminal device transmits a scanning request message and receives a response to the scanning request message.

BRIEF DESCRIPTION

According to an aspect there is provided a method comprising: performing, by an apparatus, initial channel assessment of a radio channel at maximum a determined time period shorter than or equal to the shortest of a plurality of discovery frame broadcast periodicities employed by access nodes the apparatus is configured to search for in network discovery; upon determining that a transmission has been detected in the initial channel assessment, selecting in the apparatus a network discovery according to a first network discovery method; and upon detecting no transmission on the radio channel during the initial channel assessment, selecting in the apparatus network discovery according to a second network discovery method different from the first network discovery method.

According to another aspect there is provided an apparatus comprising at least one processor and at least one memory including a computer program code. The at least one memory and the computer program code are configured, with the at least one processor, to cause the apparatus to: perform initial channel assessment of a radio channel at maximum a determined time period shorter than or equal to the shortest of a plurality of discovery frame broadcast periodicities employed by access nodes the apparatus is configured to search for in network discovery; upon determining that a transmission has been detected in the initial channel assessment, select a network discovery according to a first network discovery method; and upon detecting no transmission on the radio channel during the initial channel assessment, select network discovery according to a second network discovery method different from the first network discovery method.

According to another aspect, there is provided a computer program product embodied on a non-transitory distribution medium readable by an apparatus and comprising program instructions which, when loaded into the apparatus, execute a computer process comprising: performing, by the apparatus, initial channel assessment of a radio channel at maximum a determined time period shorter than or equal to the shortest of a plurality of discovery frame broadcast periodicities employed by access nodes the apparatus is configured to search for in network discovery; upon determining that a transmission has been detected in the initial channel assessment, selecting in the apparatus a network discovery according to a first network discovery method; and upon detecting no transmission on the radio channel during the initial channel assessment, selecting in the apparatus network discovery according to a second network discovery method different from the first network discovery method.

Embodiments of the invention are defined in dependent claims.

LIST OF DRAWINGS

Embodiments of the present invention are described below, by way of example only, with reference to the accompanying drawings, in which FIG. 1 illustrates an example of a wireless communication scenario to which embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is referring to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
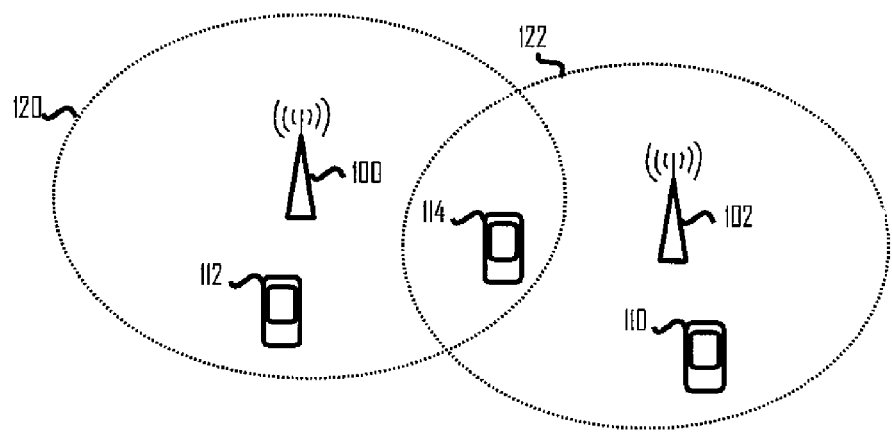

A general wireless communication scenario to which embodiments of the invention may be applied is illustrated in FIG. 1. FIG. 1 illustrates wireless communication devices comprising a plurality of access points (AP) 100, 102 and a plurality of wireless terminal devices (STA) 110, 112, 114. Each base station may be associated with a basic service set (BSS) which is a basic building block of an IEEE 802.11 wireless local area network (WLAN). The most common BSS type is an infrastructure BSS that includes a single AP together with all STAs associated with the AP. The AP may be a fixed AP or it may be a mobile AP. The APs 100, 102 may also provide access to other networks, e.g. the Internet. In another embodiment, the BSS may comprise a plurality of APs to form an extended service set (ESS). While embodiments of the invention are described in the context of the above-described topologies of IEEE 802.11 specifications, it should be appreciated that these or other embodiments of the invention may be applicable to networks based on other specifications, e.g. other versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards. Some embodiments may be applicable to networks having features under development by IEEE 802.19 task group 1 (TG1).

IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac task group extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Some networks may employ enhanced distributed channel access (EDCA) which provides quality-of-service (QoS) enhancements to medium access control (MAC) layer. The QoS enhancements may be realized by providing a plurality of access categories (AC) for prioritizing frame transmissions. The access categories may comprise the following priority levels in the order of increasing priority: background (AC_BK), best effort (AC_BE), video streaming (AC_VI), and voice (AC_VO). A higher priority frame transmission may use a shorter contention window and a shorter arbitration inter-frame spacing (AIFS) that result in higher probability of gaining the TXOP. Furthermore, some networks may employ restricted access windows (RAW) where a reduced set of wireless devices of the wireless network may carry out channel contention. The access node may define the RAW and a group of wireless devices that are allowed to attempt the channel access within the RAW. Grouping allows partitioning of the wireless devices into groups and restricting channel access only to wireless devices belonging to a specified group at any given time period. The time period may be enabled by allocating slot duration and a number of slots in RAW access. The grouping may help to reduce contention by restricting access to the medium only to a subset of the wireless devices. The grouping may also reduce the signalling overhead.

The STA (or AP) may carry out the CCA procedure in order to determine whether the channel is free or busy. Upon detecting radio energy that exceeds a preset threshold on the channel, the STA may determine that the channel is busy and prevent the transmission. On the other hand, if the STA detects no radio energy exceeding the threshold on the channel during the determined time period, it may carry out the transmission. The STA may use a single threshold in the CCA procedure but, in some embodiments, a plurality of thresholds and frame detection are applied. Upon detecting a transmission on the channel, the STA may determine whether the on-going transmission is a frame header or frame payload portion. An example of the frame header is a physical layer convergence protocol (PLCP) header, while an example of the frame payload portion is a physical layer service data unit (PSDU). Then, the STA may determine a threshold for use with the detected transmission. For example, a first threshold may be applied to the frame header while a second, different threshold may be applied to the frame payload portion. The first threshold may be denoted by a carrier sensing header threshold, while the second threshold may be denoted by a carrier sensing data unit threshold. By default, the carrier sensing data unit threshold may be −62 decibels with respect to one milliwatt (dBm), while the carrier sensing header threshold may be −82 dBm. Accordingly, the STA may be more sensitive with respect to frame headers than with respect to frame payload portions. This ensures that the headers will less likely collide with other impending transmissions, while spatial reuse of the channel is encouraged for payload portions.

A virtual carrier sensing function is provided by the provision of a network allocation vector (NAV) which is used to reserve a channel for the duration of the TXOP. Most of the transmitted frames comprise a duration field which can be used to reserve the medium, or provide duration of the NAV protection, for the duration indicated by the value of the duration field. In practice, the NAV is a timer that indicates the amount of time the medium will be reserved. In a typical operation, the transmitting station (STA) will set the value of the duration field according to the time for which it expects to use the medium while all receiving STAs, except the intended receiver, update their NAV appropriately with the information in the duration field and count down from the NAV to zero before starting the channel contention. The virtual carrier sensing function indicates that the medium is busy when NAV is non-zero and idle when NAV is zero. The NAV may be set to protect frame transmissions. The communication devices obtain the NAV on the primary channel of the BSS.

As described above, the BSS may be represented by the access node and one or more terminal devices connected to the access node. In the example of FIG. 1, the access node 100 and the terminal devices 112, 114 may be comprised in the first BSS and, thus, in the same wireless network while other terminal devices and access nodes (not shown) may be comprised in a second BSS which may be a neighbour to the first BSS and an OBSS with respect to the first BSS. This is a common situation in dense deployment scenarios where multiple overlapping wireless networks have been installed. The first BSS and the second BSS may be overlapping BSSs in the sense that at least some of the devices first BSS are capable of receiving frames from the second BSS and vice versa.

With respect to the definition of the wireless network in the context of the present description, the wireless network may comprise a single BSS or a plurality of BSSs. According to a viewpoint, the wireless network may comprise a plurality of BSSs that have the same service set identifier (SSID) the same roaming identifier, and/or the same roaming partnership.

A terminal device may establish a connection with any one of the access nodes it has detected to provide a wireless connection within the neighbourhood of the terminal device. In the example of FIG. 1, let us assume a situation where the terminal device 112 located within a coverage area 120 of the access node 100 establishes a connection to that access node 100. The connection establishment may include authentication in which an identity of the terminal device is established in the access node. The authentication may comprise exchanging an encryption key used in the BSS. After the authentication, the access node and the terminal device may carry out association in which the terminal device is fully registered in the BSS, e.g. by providing the terminal device with an association identifier (AID). It should be noted that in other systems terms authentication and association are not necessarily used and, therefore, the association of the terminal device to an access node should be understood broadly as establishing a connection between the terminal device and the access node such that the terminal device is in a connected state with respect to the access node and scanning for downlink frame transmissions from the access node and its own buffers for uplink frame transmissions.

The terminal device 110 located in a coverage area 122 of the access node 102 may associate to the access node 102, and the terminal device 114 located in both coverage areas 120, 122 may associate to either access node 100, 102. The terminal devices 110 to 114 may discover the access nodes 100, 102 through a network discovery process.

IEEE 802.11ai task group defines principles for fast initial link setup (FILS). One aspect of the principles is to enable faster and more precise AP and network discovery. Some principles relate to passive scanning in which a scanning device, e.g. a STA, passively scans channels for any beacon, management, or advertisement frames. Other principles relate to active scanning in which the scanning device actively transmits a scanning request message, e.g. a Probe Request message or a generic advertisement service (GAS) request, in order to query for present APs or networks. The probe request may also set some conditions that a responding device should fulfil in order to respond to the probe request. In some embodiments, the scanning device may be called a requesting device or a requesting apparatus. Responding devices may transmit scanning response messages, e.g. Probe Response messages, in response to the scanning request message, wherein the scanning response message may contain information on the responding device, its network, and other networks. The responding device may also send unsolicited probe response messages. Embodiments of the scanning enhancements described herein encompass the network discovery signalling, probe request-response processes, as well as GAS request-response processes.

Optimized Connectivity Experience (OCE) in Wi-Fi Alliance (WFA) is a program which has been charted to define mechanisms that improve the connectivity experience by utilizing information available in planned and managed networks. Among other features, OCE is adding new network discovery mechanisms one of which may be called a dense deployment discovery mode for OCE-capable devices. The new discovery mechanism aims to reduce signaling overheads. The target is that the OCE-capable terminal device would discover the available OCE-capable access nodes by using only passive scanning and the terminal device would not need to perform other scanning operations after the initial passive scanning, at least in most scenarios. However, it would be advantageous if the terminal devices are able to detect access nodes that are not OCE-capable (so-called legacy access nodes).

The legacy access nodes may transmit a beacon with 100 ms (milliseconds) periodicity, while the OCE-capable access nodes enhance the passive scanning by transmitting additional FILS Discovery frames between Beacon frames. As per current discussion in OCE group in Wi-Fi Alliance, the FILS Discovery frames are transmitted once every 20 ms. Accordingly, it may be assumed that an OCE-capable terminal device discovers an OCE-capable access node relatively fast without additional signaling from OCE-capable terminal device.

The active scanning associated with the legacy access nodes may cause signaling overhead, particularly in dense deployment scenarios. On the other hand, an effective selection logic is needed for an apparatus supporting both active scanning and passive scanning. If the terminal device selects the passive scanning method in a situation where there are no OCE-capable access nodes present, the detection of a legacy access node is time-consuming. On the other hand, if the terminal device selects the active scanning method in a situation where there is an OCE-capable access node present, the terminal device may cause additional signaling overhead with the transmitted scanning requests.

When the terminal device initiates the active scanning, it starts competing on the channel after a probe delay, or after it has detected transmission from other device. The target of this operation is to ensure that the scanning device has obtained NAV value and does not collide with an ongoing transmission. After obtaining access to the channel, the scanning device sends a scanning request frame and waits for an access node to respond with a scanning response frame. When using the passive scanning in the second network discovery method, the terminal device may wait for a transmission of a discovery frame from an access node.

Figure 2:
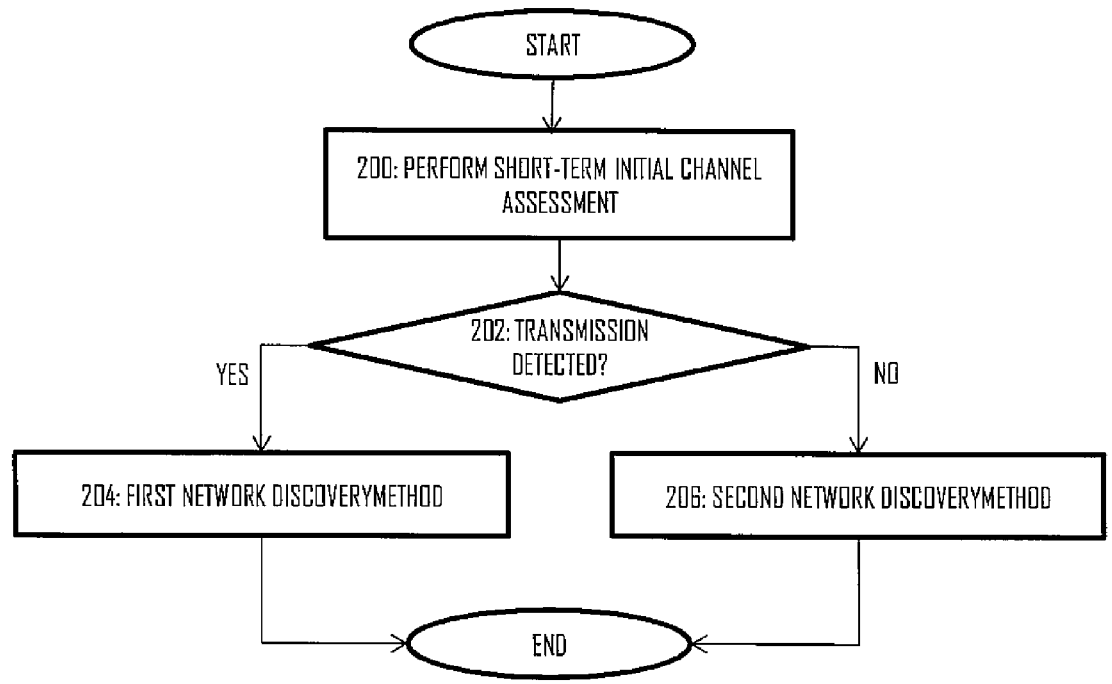
FIG. 2 illustrates a signalling diagram of a network discovery process according to an embodiment of the invention.

FIG. 2 illustrates a signalling diagram of a method for selecting a network discovery method in an apparatus according to an embodiment of the invention. The apparatus may be a terminal device, e.g. a terminal device 110, 112, or 114. Referring to FIG. 2, the method comprises in the apparatus: performing, by an apparatus, initial channel assessment of a radio channel at maximum a determined time period shorter than or equal to the shortest of a plurality of discovery frame broadcast periodicities employed by access nodes the apparatus is configured to search for in network discovery (block 200); upon determining that a transmission has been detected in the initial channel assessment (YES in block 202), selecting in the apparatus a network discovery according to a first network discovery method (block 204); and upon detecting no transmission on the radio channel during the initial channel assessment (NO in block 202), selecting in the apparatus network discovery according to a second network discovery method different from the first network discovery method (block 206).

In an embodiment, the determined time period is equal to the shortest of the plurality of discovery frame broadcast periodicities.

The embodiment of FIG. 2 may employ in the initial channel assessment an estimate of channel utilization as a criterion for the selection of the network discovery method, e.g. the passive scanning or the active scanning. Upon detecting a transmission, the apparatus may determine that the channel is densely utilized and choose the first network discovery method employing the passive scanning only.

Accordingly, the apparatus will not congest the channel with unnecessary scanning requests in a situation where the channel is densely utilized. Additionally, the apparatus may reduce power consumption by preventing unnecessary active scanning. Upon detecting no transmissions, the apparatus may determine that the channel is not utilized densely and select the network discovery method employing the second network discovery method employing active scanning or, in another embodiment, select a network discovery method enabling both active and passive scanning functions. Accordingly, the apparatus may speed up discovery of a network in a situation where the channel is not utilized densely by enabling the active scanning.

In another embodiment, both network discovery methods may employ both active scanning and the passive scanning but the first network discovery method may specify different rules for the active scanning than the second network discovery method. The result of the rules may be that the apparatus employing the first network discovery method transmits the scanning messages less often than the apparatus employing the second network discovery method. The first network discovery method may specify, for example, restrictions to the transmission timing of the scanning request messages, while the second network discovery method specifies no such restrictions.

As described above, the terminal device may be configured to search for access nodes that transmit discovery frames with a higher periodicity (higher frequency), e.g. with 20 ms periodicity, and access nodes that transmit the discovery frames with a lower periodicity (lower frequency), e.g. 100 ms periodicity. Accordingly, the duration of the initial channel assessment may be shorter than the periodicity of said higher periodicity.

In an embodiment, the apparatus has performed the initial channel assessment before the execution of the procedure of FIG. 2. The initial channel assessment may have been made as a part of conventional channel access by the apparatus. Any time the apparatus performs channel scanning in an attempt to access the channel for frame transmissions or in an attempt to detect transmissions by other apparatuses, the apparatus may store a record of a detected frame transmission or, in general, a record of detected transmission on the channel. The apparatus may store in the record an identifier of the channel and at least one of the following information: the location where the discovery was performed such as satellite positioning coordinates or an identifier of a cell of a cellular communication system; information on the channel obtained from at least one other channel; an identifier of a discovered access node or a wireless network and capability of the access node or the wireless network to support only the passive scanning; a value indicating the amount of traffic on the channel; a time label indicating the timing of the latest update of the record. In another embodiment where no such initial channel assessment has been made or that information achieved in the initial channel assessment is determined to be outdated, the apparatus may initiate the initial channel assessment.

Figure 3:
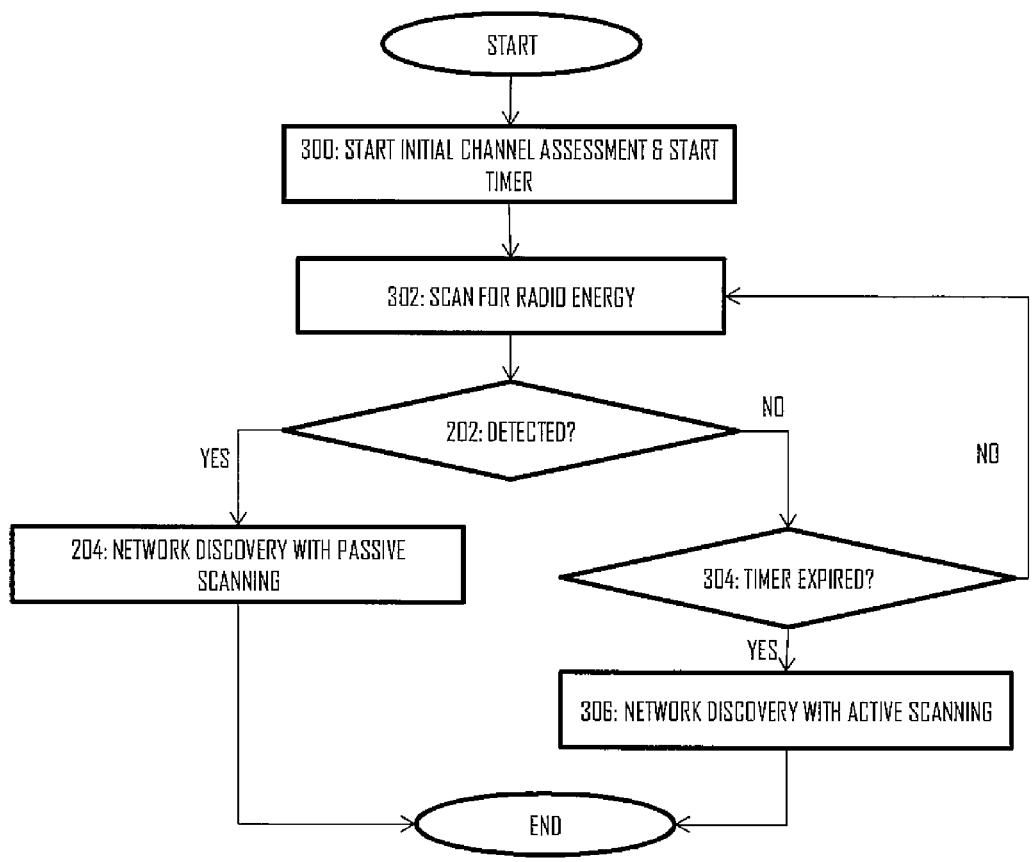
FIG. 3 illustrates an embodiment for selecting a network discovery method on the basis of an initial channel assessment.

In an embodiment, the apparatus employs a timer to define the duration of the initial channel assessment. FIG. 3 illustrates a flow diagram of such an embodiment of FIG. 2. Referring to FIG. 3, the apparatus starts the initial channel assessment in block 300. At the same time, the apparatus may start a timer counting a time period allocated to the initial channel assessment.

In an embodiment, the time period counted by the timer is shorter than or equal to a discovery frame broadcast interval of an access node supporting the passive scanning only, e.g. an OCE-capable access node. The time period may be shorter than or equal to 20 milliseconds (ms) which is the periodicity of the FILS discovery frames. The time period may be shorter than or equal to 10 ms. The time period may be shorter than or equal to 5 ms.

During the initial channel assessment, the apparatus may scan for radio energy on the radio channel (block 302). The radio channel may be a 2.4 GHz channel the apparatus knows to be used by OCE-capable access nodes, or it may be another channel the apparatus knows to be a potential operating channel of an access node to which the apparatus may associate. The apparatus may gain information on the potential operating channels from previous network discovery attempts, from information received from a cellular communication network through an access network discovery and selection function (ANDSF) specified within 3GPP ($3^{rd}$ Generation Partnership Project). Block 302 may comprise or consist of physical carrier sensing. Upon detecting a transmission or radio energy on the channel in block 202, the process may proceed to block 204 in the above-described manner. The timer may in this case be stopped upon detecting the radio energy. However, upon detecting no radio energy, the process may proceed to block 304 in which the carrier sensing is performed until the timer expires. When the timer expires, the apparatus may assume that there is no dense utilization of the radio channel and select second network discovery method employing the active scanning (block 306).

Figure 4:
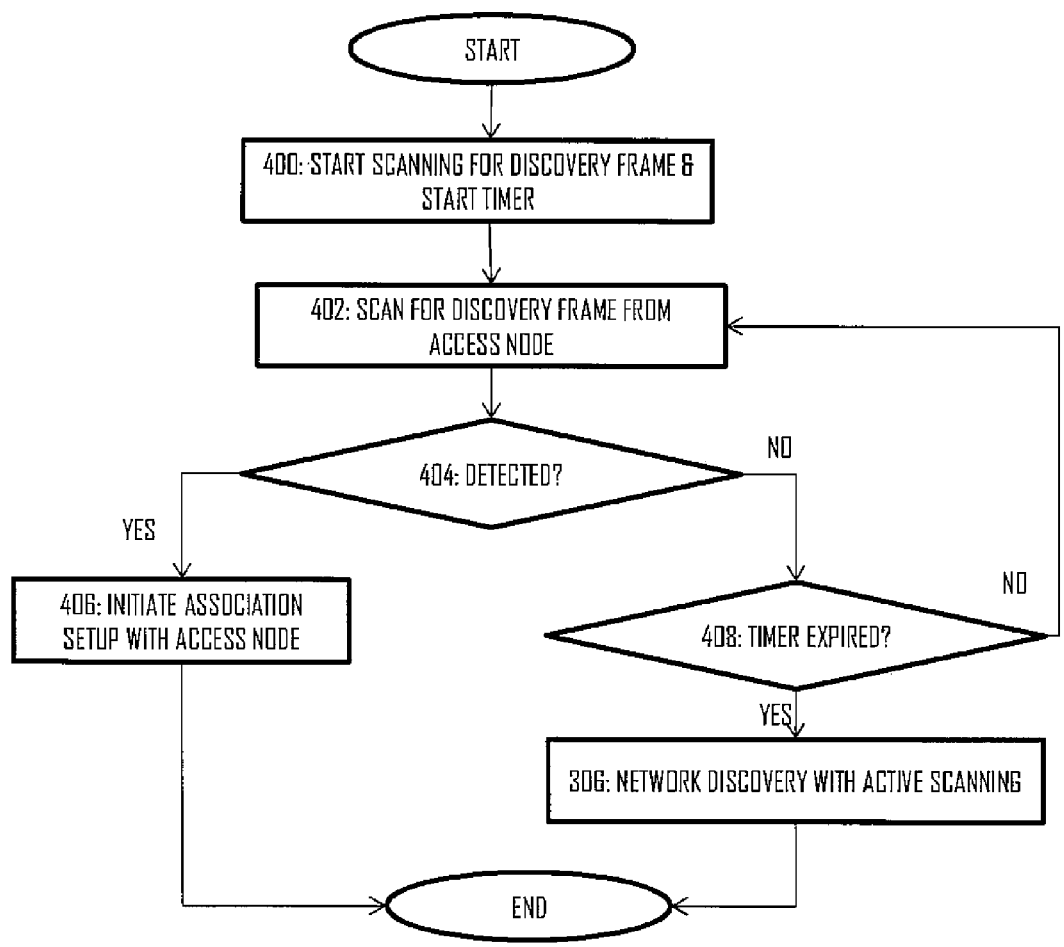
FIG. 4 illustrates an embodiment for switching a network discovery method.

In an embodiment, upon detecting no discovery frame from an access node within a determined time interval after starting the network discovery according to the passive scanning, the apparatus may switch from the passive scanning to the active scanning. FIG. 4 illustrates an embodiment of the operation of the apparatus in a situation where the apparatus has selected the passive scanning in block 204. Referring to FIG. 4, the apparatus starts the passive scanning in block 400 and starts a timer counting a determined time interval.

In an embodiment, the time interval may be longer than the time period described above in connection with FIG. 3. In an embodiment, the time interval is shorter than or equal to a discovery frame broadcast interval of an access node supporting the first network discovery method. In an embodiment, the time interval is 10 ms.

In an embodiment, the combined duration of the time period of the initial channel assessment and the time interval specifying the duration of the passive scanning after its selection is shorter than the shortest of the plurality discovery frame broadcast periodicities employed by access nodes the apparatus is configured to search for in the network discovery, e.g. shorter than the periodicity of the FILS discovery frames. In an embodiment, the combined duration of the time period and the time interval is 15 ms.

In the passive scanning, the apparatus scans for discovery frames transmitted by access nodes, e.g. OCE-capable access nodes and/or the legacy access nodes. The discovery frames may comprise beacon frames, FILS discovery frames, etc. Upon detecting a discovery frame from an access node in block 404, the process may proceed to block 406 in which the apparatus may determine that it is capable of associating to the access node, and the apparatus may initiate association to the access node. Upon detecting no discovery frame in block 404, the passive scanning for the discovery frames may be continued until the timer is detected to have expired (block 408). Upon expiry of the timer, the apparatus may switch to the active scanning (block 306) and, in an embodiment, cause transmission of a scanning request message such as a probe request message.

Figure 5:
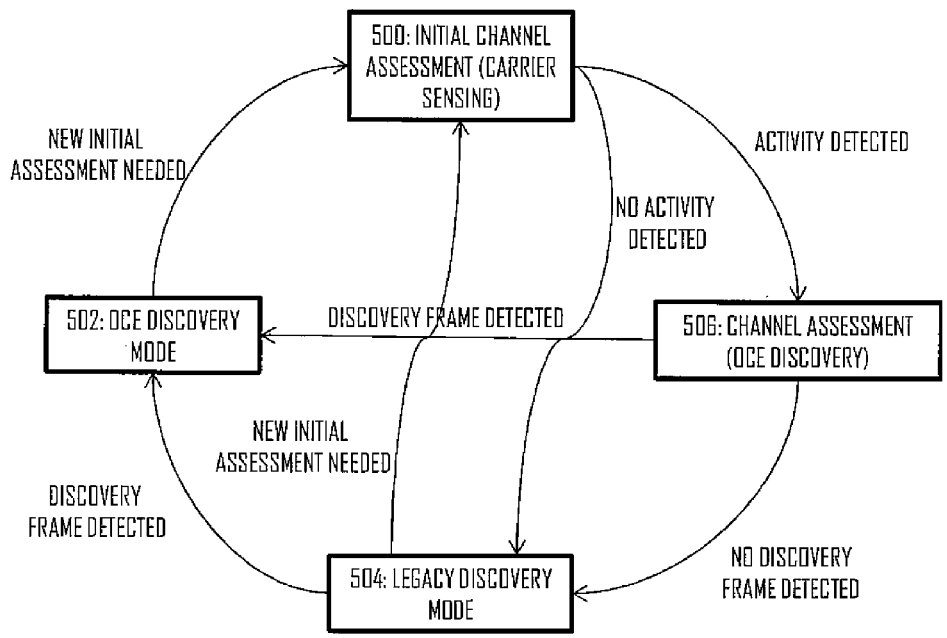
FIG. 5 illustrates a state transition diagram for the network discovery according to an embodiment of the invention.

FIG. 5 illustrates a state transition diagram of the apparatus in connection with selecting the network discovery method according to an embodiment of the invention. FIG. 5 illustrates four different states 500, 502, 504, 506 and events causing the switch from one state to another. In state 500, the apparatus performs the initial channel assessment by performing physical carrier sensing according to the embodiment of FIG. 3, for example. In state 502, the apparatus performs the network discovery employing passive scanning functions or active scanning functions such that the use of the active scanning is restricted. For example, the apparatus may be configured to provide at least a minimum delay between transmissions of consecutive scanning request messages. The delay may be 20 ms, for example. In state 504, the apparatus performs active passive scanning functions with the option of using also passive scanning. In state 504, the apparatus may freely choose to use either passive scanning or the active scanning at any time instant. In state 506, the apparatus performs channel assessment according to the passive scanning. State 506 may be performed according to the embodiment of FIG. 4, e.g. by employing the passive scanning for the determined time interval. The state 506 may be considered as a temporary or a short-term passive scanning state. The difference between state 500 and state 506 may be that the state 500 is based only on carrier sensing while the apparatus is configured to detect received frames and extract relevant network discovery information from the received frames. The received frames may comprise at least one of beacon frames, probe response frames transmitted by an access node to another apparatus, and FILS discovery frames. The relevant information may comprise any information element used exclusively by an access node supporting the passive scanning functions only or an information element indicating that an access node transmitting the frame supports the passive scanning functions only. Such an information element may be an OCE-specific information element such as an information element indicating that a transmitter of the frame supports the OCE.

Let us now describe state transitions according to some embodiments of the invention. When the apparatus has not determined the network discovery method to be used and has not available information on the channel activity, the apparatus may perform the initial channel assessment in state 500. The initial channel assessment may also be used if the information is determined to be outdated due to the time passed from the previous network discovery attempt, or the apparatus has moved a determined distance from the location where the previous network discovery attempt was made, or according to another criterion. As a consequence, the state 500 may be entered from the state 502 or 504 when the apparatus determines that a new initial channel assessment is needed. The transition from the state 500 to the state 506 may be triggered upon detecting activity on the channel being assessed. The detection may be performed by employing the physical carrier sensing during the above-mentioned time period associated with the duration of the initial channel assessment. If radio energy having reception signal strength exceeding a determined threshold is detected in the state 500, the transition to the state 506 may be triggered. Upon detecting no activity, e.g. no radio energy exceeding the threshold in the state 500, the state transition to state 504 may be triggered.

Let us now consider the state transition from the state 506. In the state 506, the apparatus attempts to detect a discovery frame according to the passive scanning. Upon detecting such a discovery frame, e.g. within the above-described time interval, the apparatus may trigger state transition to the state 502. On the other hand, upon detecting no discovery frame, e.g. within the above-described time interval, the apparatus may trigger the state transition to the state 504.

Let us now consider the state transition from the state 504. In the state 504, the apparatus attempts to discover a wireless network by employing both passive and active scanning methods freely. State 504 may be called a legacy discovery mode referring to that it may be designed for detecting the legacy access nodes broadcasting the discovery frames with the lower periodicity. State 502 may be called an OCE discovery mode referring to that it may be designed for detecting the OCE-capable access nodes broadcasting the discovery frames with the higher periodicity. Upon detecting a discovery frame associated with the use of the passive scanning only in the state 504, e.g. a FILS discovery frame indicating the OCE capability of an access node that transmitted the discovery frame, the apparatus may trigger state transition to the state 502 in which the active scanning is more restricted. Upon determining that the information on the channel assessment has been outdated, the apparatus may trigger transition to the state 500.

With respect to the state 502, upon determining that the information on the channel assessment has been outdated, the apparatus may trigger transition to the state 500. In an embodiment, the apparatus may trigger state transition from the state 506 to the state 504 upon detecting no discovery frame within a determined time duration. The time duration may be longer than the above-described time period and/or the time interval, e.g. 100 ms. As a consequence, the free use of the active scanning methods become available to the apparatus.

If the apparatus has obtained information on the channel beforehand, e.g. through previous scanning or frame reception, it may start the state machine from the state 504 in case that it knows that no access node transmitting the discovery frames with the higher periodicity is operating on the channel. The apparatus may start from the state 502 in a case where the apparatus knows that an access node transmitting the discovery frames with the higher periodicity is operating on the channel.

As described above, the apparatus may employ the active scanning in both states 502 and 504. In an embodiment, when the apparatus employs the active scanning in the state 504, the apparatus generates a scanning request message that complies with specifications of the legacy access nodes, e.g. it contains no OCE-specific information elements. In another embodiment, when the apparatus employs the active scanning in the state 504, the apparatus generates a scanning request message that complies with specifications of the OCE-capable access nodes, e.g. it contains no OCE-specific information elements. In both embodiments, the apparatus may in state 502 generate the scanning request message that complies with specifications of the OCE-capable access nodes, e.g. it contains no OCE-specific information elements.

As described above, the apparatus may store a record of scanned channels and the information on availability of the wireless networks on the scanned channels and a network discovery method of the wireless networks detected on the scanned channels. This speeds up the process of finding a wireless network.

In order to provide backward compatibility, an OCE-capable terminal device according to some embodiments of the invention may be configured to detect also the legacy access nodes. This means that the OCE-capable terminal device may implement additionally a discovery mechanism which is designed to discover efficiently such legacy networks. In other words, the terminal device may implement two network discovery methods: a first network discovery method to discover the OCE-capable access nodes and a second network discovery method to discover the legacy access nodes. Both discovery methods may employ both active scanning where the terminal device sends actively frames to discover access nodes and passive scanning where the terminal device listens for the discovery frames from the access nodes. The first network discovery method may specify certain rules for transmitting active scanning messages, while the second network discovery method may provide more relaxed rules or even no rules for the transmitting the active scanning messages. For example, the first network discovery method may specify a certain minimum time interval between two consecutive scanning messages transmitted by the terminal device, while the second network discovery method specifies no restrictions to the periodicity or time interval between the two consecutive scanning messages.

Figure 6:
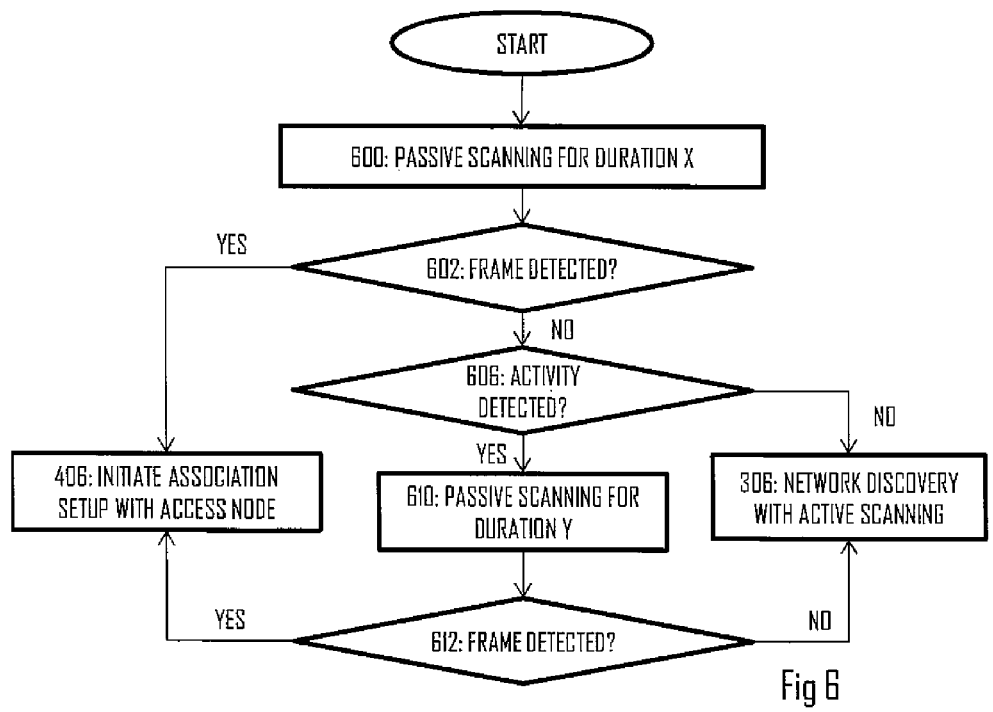
FIG. 6 illustrates a process for determining a network discovery method according to another embodiment of the invention.

In the embodiments described above in connection with FIG. 5, the initial channel assessment is performed by using carrier sensing and determining whether or not radio energy interpreted as a transmission is detected on the channel. FIG. 6 illustrates another embodiment where the apparatus may also employ frame detection and decoding in the initial channel assessment and in the detection of the transmissions. Referring to FIG. 6, the apparatus may perform the initial channel assessment in block 600 by employing passive scanning for a determined duration X, wherein the determined duration may be the above-described time period. X may be any one of the above-described values, e.g. 5 ms. The passive scanning may comprise the carrier sensing and frame decoding functions. In block 602, it is determined whether or not a frame has been detected within the duration X. If at least one of a discovery frame such as a FILS discovery frame, a beacon frame, and a probe response frame has been detected, the process may proceed to block 406 in which the apparatus may establish an association with an access node that transmitted the discovery frame. If no discovery frame has been successfully decoded within the duration X, the apparatus determines in block 606 whether or not another type of transmission has been detected. The determination may be based on the carrier sensing and/or frame detection. The determination may comprise determining whether or not radio energy exceeding a determined threshold has been detected and/or whether or not a frame other than the discovery frame has been detected. If a result of block 606 is that the transmission has been detected, the apparatus may proceed with the network discovery by employing passive scanning for a determined duration Y in block 610. The passive scanning in block 610 may comprise frame detection and decoding. The duration Y may be the above-described time interval. If a discovery frame has been detected within the duration Y (YES in block 612), the apparatus may proceed to block 604. If no transmission is detected in block 606 or no discovery frame is detected in block 612, the apparatus may proceed to block 306 and initiate the second network discovery method by causing transmission of a scanning request message. In the embodiment of FIG. 6, the first network discovery method may comprise the block 610, while the second network discovery method may comprise the block 306.

Figure 7:
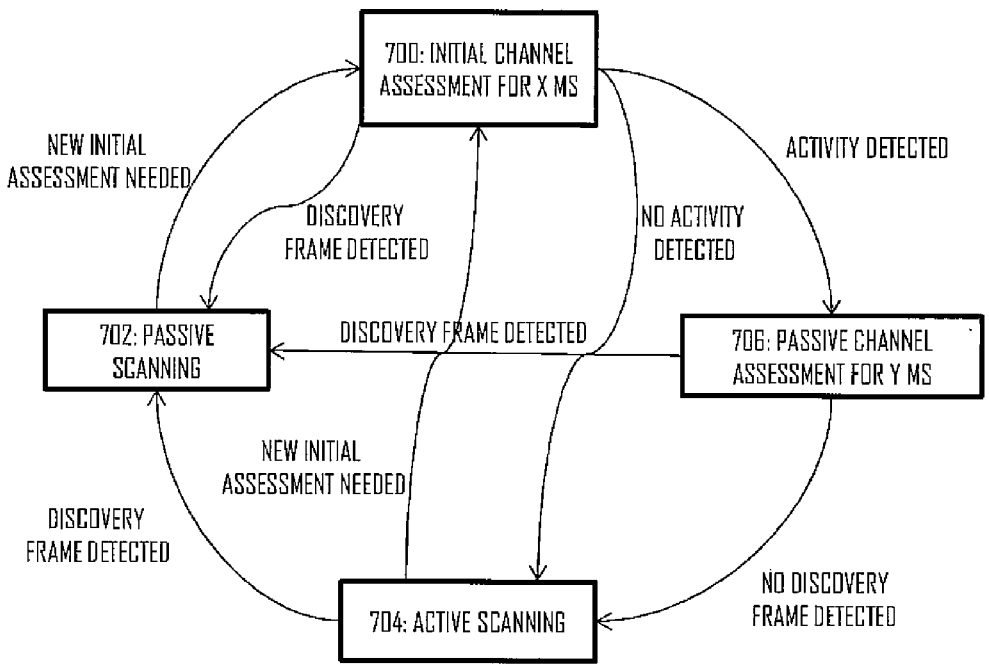
FIG. 7 illustrates a state transition diagram according to another embodiment.

FIG. 7 illustrates a state diagram corresponding to yet another embodiment. Referring to FIG. 7, state 700 may correspond to block 600, e.g. the apparatus may perform the initial channel assessment by employing the frame decoding and the carrier sensing for the duration X in the state 700. State 706 may correspond to the block 610, and the apparatus may perform the passive scanning including the frame decoding for the duration Y in the state 706. State 702 may comprise performing passive scanning, and state 704 may comprise performing active scanning.

Let us now describe state transitions according to this embodiment of the invention. When the apparatus has not determined the network discovery method to be used and has not available information on the channel activity, the apparatus may perform the initial channel assessment in state 700. The initial channel assessment may also be used if the information is determined to be outdated due to the time passed from the previous network discovery attempt, or according to another criterion, e.g. one of the criteria described above in connection with FIG. 5. As a consequence, the state 700 may be entered from the state 702 or 704 when the apparatus determines that a new initial channel assessment is needed. Transition from the state 700 to the state 702 may be triggered upon detecting a discovery frame. The detection may be based on successful decoding and identification of the discovery frame. The apparatus may in the state employ the passive scanning or only the passive scanning whenever it determines to perform network discovery. The transition from the state 700 to the state 706 may be triggered upon detecting no discovery frame but another transmission, in general activity, on the channel being assessed. The detection may be performed by employing the physical carrier sensing during the above-mentioned time period associated with the duration of the initial channel assessment. If radio energy having reception signal strength exceeding a determined threshold is detected in the state 700, the transition to the state 706 may be triggered. Upon detecting no activity, e.g. no radio energy exceeding the threshold in the state 700, the state transition to state 704 may be triggered.

Let us now consider the state transition from the state 706. In the state 706, the apparatus attempts to detect a discovery frame by employing the passive scanning for the duration Y. Upon detecting such a discovery frame, e.g. within the above-described time interval, the apparatus may trigger state transition to the state 702. On the other hand, upon detecting no discovery frame, e.g. within the above-described time interval, the apparatus may trigger the state transition to the state 704.

Let us now consider the state transition from the state 704. In the state 704, the apparatus attempts to discover a wireless network by employing the active scanning methods or both passive and active scanning methods. Upon detecting a discovery frame indicating that the passive scanning is sufficient in the network discovery, e.g. a FILS discovery frame indicating the OCE capability of an access node that transmitted the discovery frame, the apparatus may trigger state transition to the state 702 in which only the passive scanning is employed. Upon determining that the information on the channel assessment has been outdated, the apparatus may trigger transition to the state 700.

With respect to the state 702, upon determining that the information on the channel assessment has been outdated, the apparatus may trigger transition to the state 700.

In the embodiments described above, a network discovery method is selected for a channel being scanned. The network discovery method may specify according to the description above which type of scanning (active or passive) is available and, in some embodiments, under which conditions. The selection may be made between the active and the passive scanning as the network discovery method or between the above-described legacy discovery mode and the OCE discovery mode specifying different conditions for the transmission of the scanning request messages. In all cases, the apparatus may select the network discovery method per channel and store a record comprising a network discovery method selected for each scanned channel. Later on, upon returning to the channel, the apparatus may check the record and select the previously selected network discovery method without the need for performing the initial channel assessment again. When the record for a channel is considered to be outdated, a new initial channel assessment may be carried out, as described above, and the record may be updated.

Figure 8:
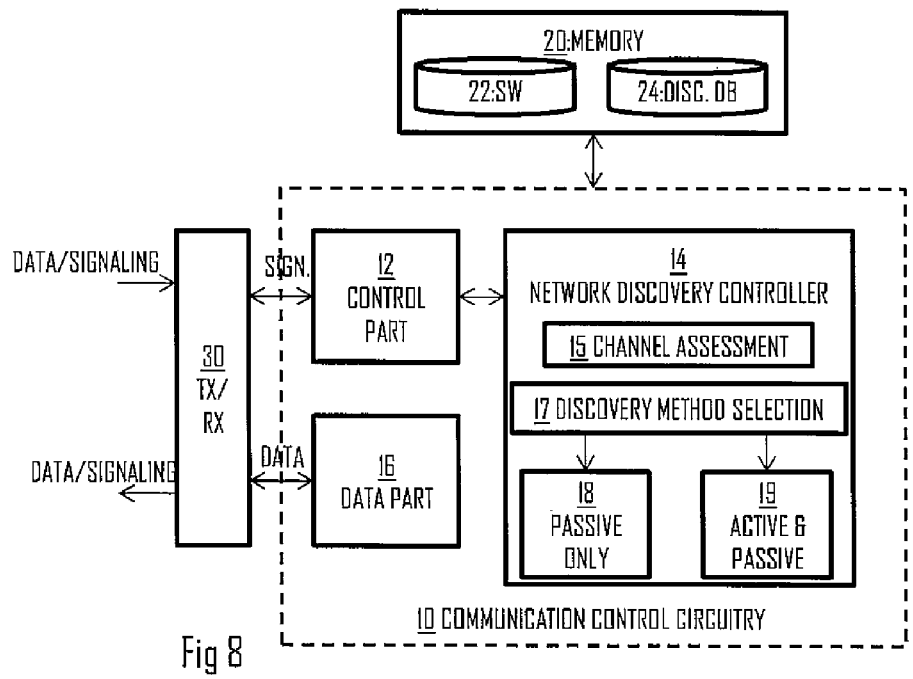
FIG. 8 illustrates a block diagram of an apparatus according to an embodiment of the invention.

FIG. 8 illustrates an embodiment of a structure of the above-mentioned functionalities of the apparatus, wherein the apparatus may be a terminal device, user equipment, a peer device, or a client device. The apparatus may comply with specifications of an IEEE 802.11 network and/or another wireless network. The apparatus may be defined as a cognitive radio apparatus capable of adapting its operation to a changing radio environment, e.g. to changes in parameters of another system on the same frequency band. The apparatus may be or may be comprised in a computer (PC), a laptop, a tablet computer, a cellular phone, a palm computer, or any other apparatus provided with radio communication capability. In another embodiment, the apparatus carrying out the above-described functionalities is comprised in such a device, e.g. the apparatus may comprise a circuitry, e.g. a chip, a chipset, a processor, a micro controller, or a combination of such circuitries in any one of the above-described devices.

Referring to FIG. 8, the apparatus may comprise a communication controller circuitry 10 configured to control wireless communications in the device. The communication controller circuitry 10 may configure the establishment, operation, and termination of connections or associations in the apparatus, as described above. The communication controller circuitry 10 may comprise a control part 12 handling control signalling communication with respect to transmission, reception, and extraction of control or management frames including beacon messages, request messages, response messages, scanning or probing messages, discovery frames, RTS messages, and clear-to-send (CTS) messages. The control part 12 may also carry out processing of headers of data frames. The communication controller circuitry 10 may further comprise a data part 16 that handles transmission and reception of payload data when the apparatus is associated to one or more other wireless devices.

The communication control circuitry 10 may further comprise a network discovery controller 14 configured to cause the apparatus to operate according to any one of the embodiments described above in connection with FIGS. 2 to 7. The network discovery controller 14 may comprise a channel assessment circuitry 15 configured to carry out the initial channel assessment described above. The channel assessment circuitry 15 may configure the control part 12 to execute physical carrier sensing on a selected channel and report whether or not radio energy exceeding a threshold has been detected on the channel and/or frame decoding in order to determine whether or not a discovery frame has been detected. Upon receiving from the control part 12 an indication that the radio energy has been detected, the channel assessment circuitry 15 may cause the control part to initiate association to a transmitter of the discovery frame. Upon receiving from the control part 12 an indication that the radio energy has been detected, the channel assessment circuitry 15 may output a corresponding control signal to a discovery method selection circuitry 17 configured to select a network discovery method. This control signal may cause the discovery method selection circuitry 17 to activate the discovery method using the passive scanning (circuitry 18). The channel assessment circuitry may further update a discovery database 24 stored in a memory 20 of the apparatus with information that activity has been detected on the channel. A time label may be attached to the information. Upon receiving from the control part 12 an indication that no radio energy has been detected, the channel assessment circuitry 15 may output a corresponding control signal to the discovery method selection circuitry 17. This control signal may cause the discovery method selection circuitry 17 to activate the discovery method using the active scanning (circuitry 19). The channel assessment circuitry 15 may further update the discovery database 24 with information that no activity has been detected on the channel. A time label may be attached to the information.

The channel assessment circuitry 15 may be invoked according to the state transition diagram of FIG. 5 when the state 500 is entered. The discovery method selection circuitry 17 may invoke the circuitry 18, upon is entering the state 506, temporarily for a maximum duration defined by the above-described time interval. The discovery method selection circuitry 17 may invoke the circuitry 18, for a longer duration, upon entering the state 502. The discovery method selection circuitry 17 may invoke the circuitry 19 upon entering the state 504.

The circuitries 12 to 19 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 19 or all of them.

The apparatus may further comprise the memory 20 that stores computer programs (software) 22 configuring the apparatus to perform the above-described functionalities. The memory 20 may also store communication parameters and other information needed for the wireless communications. The memory 20 may store the discovery database 24 storing the above-described records on the channel assessment.

The apparatus may further comprise radio interface components 30 providing the apparatus with radio communication capabilities within one or more wireless networks. The radio interface components 30 may comprise standard well-known components such as an amplifier, filter, frequency-converter, (de)modulator, and encoder/decoder circuitries and one or more antennas. The apparatus may in some embodiments further comprise a user interface enabling interaction with the user of the communication device. The user interface may comprise a display, a keypad or a keyboard, a loudspeaker, etc.

In an embodiment, the apparatus carrying out the embodiments of the invention in the wireless device comprises at least one processor 10 and at least one memory 20 including a computer program code 22, wherein the at least one memory and the computer program code are configured, with the at least one processor, to cause the apparatus to carry out the functionalities of the wireless device according to any one of the embodiments of FIGS. 2 to 7. According to an aspect, when the at least one processor 10 executes the computer program code, the computer program code causes the apparatus to carry out the functionalities of the wireless device according to any one of the embodiments of FIGS. 2 to 7. According to another embodiment, the apparatus carrying out the embodiments of the invention in the wireless device comprises the at least one processor 10 and at least one memory 20 including a computer program code 22, wherein the at least one processor 10 and the computer program code 22 perform the at least some of the functionalities of the wireless device according to any one of the embodiments of FIGS. 2 to 7. Accordingly, the at least one processor, the memory, and the computer program code form processing means for carrying out embodiments of the present invention in the wireless device. According to yet another embodiment, the apparatus carrying out the embodiments of the invention in the wireless device comprises a circuitry including at least one processor 10 and at least one memory 20 including computer program code 22. When activated, the circuitry causes the apparatus to perform the at least some of the functionalities of the wireless device according to any one of the embodiments of FIGS. 2 to 7.

As used in this application, the term 'circuitry' refers to all of the following: (a) hardware-only circuit implementations, such as implementations in only analogue and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a wireless device.

The processes or methods described in FIGS. 2 to 7 may also be carried out in the form of a computer process defined by a computer program. The computer program may be in source code form, object code form, or in some intermediate form, and it may be stored in a transitory or a non-transitory carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless networks defined above but also to other suitable wireless communication systems. The protocols used, the specifications of wireless networks, their network elements and terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
performing, by an apparatus, passive scanning on a radio channel during a first time period, wherein the first time period is shorter than a beacon frame transmission period and wherein the first time period is shorter than a fast initial link setup frame transmission period;
upon determining, after the first time period, that no discovery frame has been detected on the radio channel during the first time period, determining whether another type of frame, different from a discovery frame has been detected on the radio channel during the first time period;
if said another type of frame has been detected on the radio channel during the first time period, determining, by the apparatus, to perform passive scanning on the radio channel during a second time period, wherein the second time period is subsequent to the first time period; and
if no frame transmission has been detected on the radio channel during the first time period, determining by the apparatus, to perform active scanning on the radio channel.

2. The method of claim 1, wherein the first time period is shorter than 20 milliseconds.

3. The method of claim 1, wherein the passive scanning comprises of carrier-sensing.

4. The method of claim 1, wherein the passive scanning comprises decoding frame headers.

5. The method of claim 1, further comprising in the apparatus in the first network discovery method:
determining whether or not the transmission comprises a discovery frame from an access node;
upon detecting the discovery frame within the second time period, causing association to the access node;
upon detecting no discovery frame within the second time period, determining to perform active scanning on the radio channel after the second time period.

6. The method of claim 1, further comprising:
upon detecting a discovery frame from an access node within the second time period, causing association to the access node; and
upon detecting no discovery frame from an access node within the second time period, determining to perform active scanning on the radio channel after the second time period selecting.

7. The method of claim 1, wherein a combined duration of the first determined time period and the second time period is shorter than the fast initial link setup frame transmission period.

8. The method of claim 1, wherein the first time period is shorter than the second time period.

9. The method of claim 1, wherein the active scanning comprises causing transmission of a scanning request message.

10. An apparatus comprising:
at least one processor; and
at least one memory including a computer program code, wherein the at least one memory and the computer program code are configured, with the at least one processor, to cause the apparatus to:
perform passive scanning on a radio channel during a first time period, wherein the first time period is shorter than a beacon frame transmission period and wherein the first time period is shorter than a fast initial link setup frame transmission period;
upon determining, after the first time period, that no discovery frame has been detected on the radio channel during the first time period, determining whether another type of frame, different from a discovery frame has been detected on the radio channel during the first time period;

if said another type of frame has been detected on the radio channel during the first time period determining, by the apparatus, to perform passive scanning on the radio channel during a second time period, wherein the second time period is subsequent to the first time period; and if no frame transmission has been detected on the radio channel during the first time period, determining by the apparatus, to perform active scanning on the radio channel.

11. The method of claim 10, wherein the first time period is shorter than 20 milliseconds.

12. The apparatus of claim 10, wherein the at least one memory and the computer program code are configured, with the at least one processor, to cause the apparatus to perform carrier-sensing in the passive scanning.

13. The apparatus of claim 10, wherein the at least one memory and the computer program code are configured, with the at least one processor, to cause the apparatus to decode frame headers in the passive scanning.

14. The apparatus of claim 10, wherein the at least one memory and the computer program code are configured, with the at least one processor, to cause the apparatus to perform at least the following in the first network discovery method:

determine whether or not the transmission comprises a discovery frame from an access node;

upon detecting the discovery frame within the second time period, cause association to the access node;

upon detecting no discovery frame within the second time period, determining to perform active scanning on the radio channel after the second time period.

15. The apparatus of claim 14, wherein the at least one memory and the computer program code are configured, with the at least one processor, to cause the apparatus to:

upon detecting a discovery frame from an access node within the second time period, cause association to the access node; and upon detecting no discovery frame from an access node within the second time period, determine to perform active scanning on the radio channel after the second time period.

16. The apparatus of claim 14, wherein the combined duration of the first time period and the second time period is shorter than the shortest of a plurality discovery frame broadcast periodicities employed by access nodes the apparatus is configured to search for in the network discovery.

17. The apparatus of claim 14, wherein the first time period is shorter than the second time period.

18. The apparatus of claim 10, wherein the at least one memory and the computer program code are configured, with the at least one processor, to cause the apparatus to cause transmission of a scanning request message in the active scanning.

19. The apparatus of claim 10, further comprising radio interface components providing the apparatus with radio communication capability.

20. A computer program product embodied on a non-transitory distribution medium readable by an apparatus and comprising program instructions which, when loaded into the apparatus, execute a computer process comprising:

performing, by the apparatus, passive scanning on a radio channel during a first time period, wherein the first time period is shorter than a beacon frame transmission period and wherein the first time period is shorter than a fast initial link setup frame transmission period;

upon determining, after the first time period, that no discovery frame has been detected on the radio channel during the first time period, determining whether another type of frame, different from a discovery frame has been detected on the radio channel during the first time period;

if said another type of frame has been detected on the radio channel during the first time period, determining, by in the apparatus, to perform passive scanning on the radio channel during a second time period, wherein the second time period is subsequent to the first time period; and if no frame transmission has been detected on the radio channel during the first time period, determining by the apparatus, to perform active scanning on the radio channel.

* * * * *

UNITED STATES PATENT AND TRADEMARK OFFICE
CERTIFICATE OF CORRECTION

| | |
|---|---|
| PATENT NO. | : 9,730,148 B2 |
| APPLICATION NO. | : 14/638165 |
| DATED | : August 8, 2017 |
| INVENTOR(S) | : Janne Marin et al. |

It is certified that error appears in the above-identified patent and that said Letters Patent is hereby corrected as shown below:

In Claim 6:
Column 16, Line 44, "selecting" should be deleted.

In Claim 20:
Column 18, Line 33, "in" should be deleted.

Signed and Sealed this
Third Day of October, 2017

Joseph Matal
*Performing the Functions and Duties of the
Under Secretary of Commerce for Intellectual Property and
Director of the United States Patent and Trademark Office*